(12) United States Patent
Niibo et al.

(10) Patent No.: US 6,338,806 B1
(45) Date of Patent: *Jan. 15, 2002

(54) ELECTROLYTIC CAPACITOR AND DRIVING ELECTROLYTE THEREOF

(75) Inventors: Nario Niibo; Kazumitsu Honda, both of Katano (JP)

(73) Assignee: Matsushita Electric Industrial Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/386,456

(22) Filed: Aug. 31, 1999

(30) Foreign Application Priority Data

Aug. 31, 1998 (JP) .......................... 10-244884

(51) Int. Cl.$^7$ ............................... H01G 9/035
(52) U.S. Cl. ................ 252/62.2; 361/503; 361/505
(58) Field of Search ..................... 252/62.2; 361/503, 361/505; 429/347; 204/296

(56) References Cited

U.S. PATENT DOCUMENTS

| | | | | | |
|---|---|---|---|---|---|
| 3,588,625 A | * | 6/1971 | Kihara et al. | ............... | 252/62.2 |
| 4,107,761 A | * | 8/1978 | Oyama | ............... | 252/62.2 |
| 5,776,358 A | * | 7/1998 | Niibo et al. | ............... | 252/62.2 |

FOREIGN PATENT DOCUMENTS

| | | | |
|---|---|---|---|
| JP | 57-34327 | * | 2/1982 |
| JP | 60-13293 | * | 4/1985 |
| JP | 63-15738 | | 4/1988 |
| JP | 58-232152 | * | 4/1988 |
| JP | 63-100709 | * | 5/1988 |
| JP | 2731241 | * | 12/1990 |
| JP | 3-76776 | | 12/1991 |
| JP | 6-29156 | * | 2/1994 |
| JP | 6-29157 | * | 2/1994 |
| JP | 06 029 156 A | | 2/1994 |
| JP | 06 029 157 A | | 2/1994 |
| JP | 06 168 850 A | | 6/1994 |
| JP | 6-168850 | * | 6/1994 |
| JP | 07 045 482 A | | 2/1995 |
| JP | 7-106207 | * | 4/1995 |
| JP | 07 106 207 A | | 4/1995 |
| JP | 7-70443 | | 7/1995 |
| JP | 07 245 246 A | | 9/1995 |
| JP | 07 245 247 A | | 9/1995 |
| JP | 7-320984 | * | 12/1995 |
| JP | 2681202 | | 8/1997 |
| JP | 2731241 | | 12/1997 |
| WO | WO96/27201 | * | 9/1996 |

\* cited by examiner

Primary Examiner—C. Melissa Koslow
(74) Attorney, Agent, or Firm—Parkhurst & Wendel, L.L.P.

(57) ABSTRACT

Driving electrolytes for electrolytic capacitors of the present invention contain boric acid esters and/or their salts of the structural formulae:

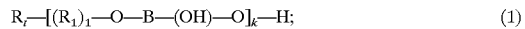

(1)

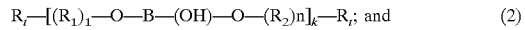

(2)

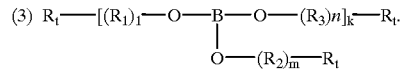

In the foregoing formulae, $R_t$ represents $CH_3$ or H ; $R_1$, $R_2$ and $R_3$ represent $—CH_2O$, $—C_2H_4O$, $—C_3H_6O$, or $—C_4H_8O$; and K, l, and m indicate arbitrary natural numbers. Other electrolytes of the present invention further include inorganic acids and/or organic acids and have boric acid esters and/or their salts of the foregoing structural formulae dissolved in the solvent thereof. Using the above-mentioned electrolyte, an electrolytic capacitor which has high withstand voltage of not less than 500V even at the temperatures of 125° C. can be obtained.

6 Claims, 2 Drawing Sheets

ELECTROLYTIC CAPACITOR AND DRIVING ELECTROLYTE THEREOF

FIELD OF THE INVENTION

The present invention relates to electrolytic capacitors and driving electrolytes for the same.

BACKGROUND OF THE INVENTION

Boric acid and ammonium borate have traditionally been used as solutes for driving electrolytes (hereinafter, electrolyte) in electrolytic capacitors. Since boric acid and ammonium borate have reasonable anodizing abilities, they have been used in the production of high-voltage capacitors for a long time. However, boric acid and ammonium borate contain condensed water molecules. Therefore, they cannot be used in production of electrolytic capacitors which operate in temperature ranges of 100 degrees Celsius or more.

Well-known non-aqueous electrolytes include ones using, as solutes, di-basic acids or their salts such as azelaic acid, butyl octane di-basic acid (Japanese Patent Laid Open Publication No. S60-13293), 5,6-decan di-carboxylic acid (Japanese Patent Laid Open Publication No. S63-15738), and di-basic acid with side chains (Japanese Patent No. 2681202). With these organic carboxylic acids, water in the electrolytes can be reduced, enabling control of the opening of the valve of the electrolytic capacitor, which is triggered by intensifying internal pressure, even at 100 degrees Celsius or more. Surface active agents such as poly-ethylene glycol (Japanese Patent Laid Open Publication No. H03-76776), poly-glycerine (Japanese Patent Laid Open Publication No. H07-70443), and alkylene block polymer (Japanese Patent No. 2731241) are used to raise the discharge initiation voltage and improve anodizing characteristics.

The electrolytic capacitors used for high frequency circuits and automobile applications are required to have higher withstand voltage, temperature-resistance and longer working life. However, it has been difficult to satisfy such demands with conventional electrolytes which use organic carboxylic acids or their salts as solute and which include surface active agents. The conventional electrolytes are also difficult to use when trying to raise the discharge initiating voltage in processes including anodizing.

The present invention aims at providing driving electrolytes for electrolytic capacitors which have higher withstand voltage, high temperature-resistance and a longer working life, and also providing electrolytic capacitors using such electrolytes.

SUMMARY OF THE INVENTION

In solvents of electrolytes of the present invention, (a) or (b) is dissolved:

(a) Boric acid esters and/or their salts having the following general formulae (1), (2) or (3);

(b) Boric acid esters and/or their salts having the general formulae (1), (2) or (3), which include inorganic acids and/or organic acids such as boric acid or a boric acid salt such as ammonium borate.

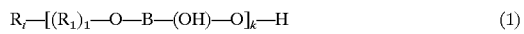

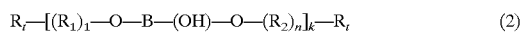

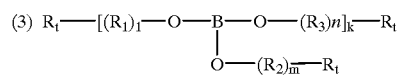

wherein $R_t$: $CH_3$ or H, $R_1$, $R_2$, and $R_3$: $-CH_2O$, $-C_2H_4O$, $-C_3H_6O$, or $-C_4H_8O$, k, l, m, and n: arbitrary natural numbers

DESCRIPTION OF THE PREFERRED EMBODIMENTS

Figure 1:
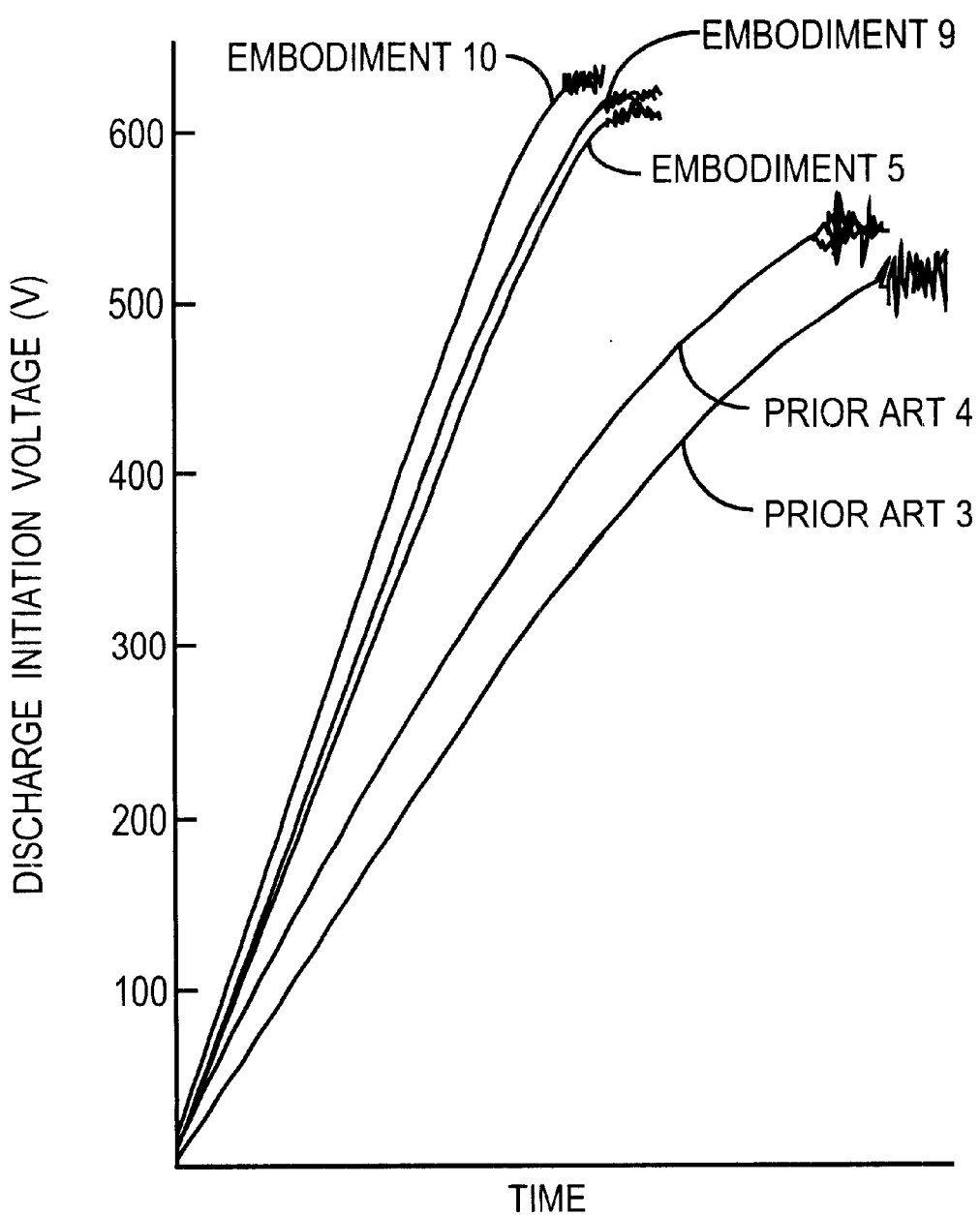
FIG. 1 is a chart showing characteristics of the discharge initiating voltage during anodizing of electrolytes in accordance with fifth, ninth and tenth preferred embodiments of the present invention and third and fourth examples of the prior art.

A preferred embodiment is described below. Compounds of boric acid esters of general formulae (1), (2) and (3) are specifically shown in Table 1. As shown in Table 1, a variety of substitution groups are available for the boric acid esters. Therefore, appropriate physical properties such as viscosity and melting point can be selected freely according to the purpose of the electrolyte. Structural formulae indicated in Table 1 are part of the general formulae (1), (2), and (3). Besides the structural formulae shown in Table 1, various other structural formulae are possible.

TABLE 1

| No. | Formula | Structural formula | Structure of substitution group |
|---|---|---|---|
| 1 | (1) | H—(CH$_2$O)$_3$—O—B—(OH)—OH | R$_1$:CH$_2$O<br>K:1, 1:3 |
| 2 | (1) | H—(C$_3$H$_6$O)$_{10}$—O—B—(OH)—OH | R$_1$:C$_3$H$_6$O<br>K:1, 1:10 |
| 3 | (1) | H—(C$_4$H$_8$O)$_8$—O—B—(OH)—OH | R$_1$:C$_4$H$_8$O<br>K:1, 1:8 |
| 4 | (1) | H—[(C$_2$H$_4$O)$_{12}$—O—B—(OH)—O]$_7$H | R$_1$:C$_2$H$_4$O<br>K:7, 1:12 |
| 5 | (2) | H—(C$_4$H$_8$O)$_5$—O—B—(OH)—O—(C$_4$H$_8$O)$_{10}$—H | R$_1$, R$_2$:C$_4$H$_8$O<br>K:1, 1:5, n:10 |
| 6 | (2) | H—(C$_3$H$_6$O)$_5$—O—B—(OH)—O—(C$_3$H$_6$O)$_5$—H | R$_1$, R$_2$:C$_3$H$_6$O<br>K:1, 1:5, n:5 |

TABLE 1-continued

| No. | Formula | Structural formula | Structure of substitution group |
|---|---|---|---|
| 7 | (2) | H—($C_4H_8O)_7$—O—B—(OH)—O—($C_2H_4O)_{10}$—H | $R_1$:$C_4H_8O$<br>$R_2$: $C_2H_4O$<br>K:1, 1:7, n:5 |
| 8 | (2) | H—[($CH_2O)_2$—O—B—(OH)—O—($C_2H_4O)_{10}]_{15}$—H | $R_1$:$CH_2O$<br>$R_2$: $C_2H_4O$<br>K:15, 1:2, n:10 |
| 9 | (3) | H—($C_2H_4O)_8$—O—B—O—($C_2H_4O)_7$—H<br>                                    \|<br>                                  O—($C_2H_4O)_8$—H | $R_1$:$C_2H_4O$<br>$R_2$:$C_2H_4O$<br>$R_3$:$C_2H_4O$<br>K:1, 1:8, m:8, n:7 |
| 10 | (3) | H—($C_4H_8O)_5$—O—B—O—($C_2H_4O)_5$—$CH_3$<br>                                    \|<br>                                  O—($C_2H_4O)_{10}$—H | $R_1$:$C_4H_8O$<br>$R_2$: $C_2H_4O$<br>$R_3$:$C_2H_4O$<br>K:1, 1:5, m:10, n:5 |
| 11 | (3) | H—($C_4H_8O)_2$—O—B—O—($C_3H_6O)_{10}$—H<br>                                    \|<br>                                  O—($C_3H_6O)_8$—H | $R_1$:$C_4H_8O$<br>$R_2$: $C_2H_4O$<br>$R_3$:$C_2H_4O$<br>K:1, 1:2, m:8, n:10 |
| 12 | (3) | H—( ($CH_2O)_2$—O—B—O—$C_2H_4O$ )—H<br>                              \|<br>                            O—($C_3H_6O)_5$  $)_{15}$ —H | $R_1$:$CH_2O$<br>$R_2$:$C_3H_6O$<br>$R_3$:$C_2H_4O$<br>K:15, 1:2, m:5, n:1 |

Table 2 shows characteristics of electrolytes using boric acid esters described in Table 1. In Table 2, (A), (B), (C) and (D) are examples of the prior art.

TABLE 2

| Embodiment No. | Components | Composition Wt % | Conductivity (mS/cm) | Discharge initiating voltage (V) |
|---|---|---|---|---|
| 1 | Ethylene glycol<br>No. 1 in Table 1<br>ammonia water | 77<br>20<br>3 | 0.95 | 580 |
| 2 | Ethylene glycol<br>No. 2 in Table 1<br>Ammonium nitrate<br>Ammonia water | 72<br>20<br>5<br>3 | 0.92 | 585 |
| 3 | Ethylene glycol<br>No. 2 in Table 1<br>Ammonium nitrate<br>Ammonia water | 66<br>30<br>2<br>2 | 0.83 | 590 |
| 4 | Ethylene glycol<br>No. 3 in Table 1<br>Ammonia water | 72<br>25<br>3 | 0.80 | 590 |
| 5 | Ethylene glycol<br>No. 5 in Table 1<br>Ammonia water | 77<br>20<br>3 | 0.77 | 605 |
| 6 | Ethylene glycol<br>No. 8 in Table 1<br>Ammonia water | 77<br>20<br>3 | 0.75 | 600 |
| 7 | Ethylene glycol<br>No. 10 in Table 1<br>Ammonia water | 77<br>20<br>3 | 0.79 | 600 |
| 8 | Ethylene glycol<br>No. 8 in Table 1<br>Ammonia water | 77<br>20<br>3 | 0.72 | 605 |
| 9 | Ethylene glycol<br>No. 4 in Table 1<br>Boric acid<br>Ammonia water | 69<br>20<br>8<br>3 | 0.73 | 610 |
| 10 | Ethylene glycol<br>No. 4 in Table 1<br>Ammonia water<br>Mannite | 77<br>20<br>3<br>3 | 0.70 | 625 |
| 11 | Ethylene glycol<br>No. 6 in Table 1<br>Ammonia water<br>1,7 ODCA * | 72<br>20<br>3<br>10 | 1.4 | 560 |
| 12 | Ethylene glycol<br>No. 7 in Table 1<br>Ammonia water<br>Mannite<br>Ammonium borate<br>1,7- ODCA * | 67<br>20<br>3<br>3<br>2<br>5 | 1.2 | 590 |
| Prior art 1 (A) | Ethylene glycol<br>Ammonium azelate<br>Water | 87<br>10<br>3 | 3.4 | 590 |
| Prior art 2 (B) | Ethylene glycol<br>1,7- ODCA<br>water | 87<br>10<br>3 | 2.5 | 510 |
| Prior art 3 (C) | Ethylene glycol<br>Ammonium borate<br>Boric acid | 80<br>10<br>10 | 1.0 | 510 |
| Prior art 4 (D) | Ethylene glycol<br>Ammonium borate<br>Boric acid<br>Poly-glycerine | 75<br>10<br>10<br>5 | 0.9 | 540 |

* 1,7- ODCA: ammonium 1,7-octane di-carboxylate

As shown in Table 2, boric acid esters of the present invention have excellent anodizing properties with high discharge initiating voltages. Although the conductivity of boric acid esters of the present invention is not as high as that of conventionally used organic acids, the level of conductivity of boric acid esters can be maintained at levels equal to those of boric acid and ammonium borate. The boric acid esters of the present invention, as shown in Table 2, achieve significantly higher discharge initiating voltages while maintaining conductivity, by using organic acids and their salts.

FIG. 1 is a chart showing characteristics of the discharge initiating voltage of the fifth, ninth and tenth preferred embodiments and the third and fourth examples of the prior art. As FIG. 1 clearly shows, the fifth, ninth and tenth preferred embodiments have better anodizing properties and achieve higher discharge initiating voltages than the third and fourth examples of the prior art. The reason is that the electrolytes of the present invention allow the oxide film to be repaired desirably.

The following is a description of the case in which the electrolytes of the present invention are used in an electrolytic capacitor.

In general, elements of electrolytic capacitors are constructed by rolling up an anode foil 1 and a cathode foil 2 both made of aluminum, disposing an insulator 3 in between. The anode foil 1 and the cathode foil 2 have lead terminals 4 connected thereon. The element is impregnated with electrolyte, put into an aluminum case and the like and sealed by a sealing material such as rubber, to form an electrolytic capacitor.

Figure 2:
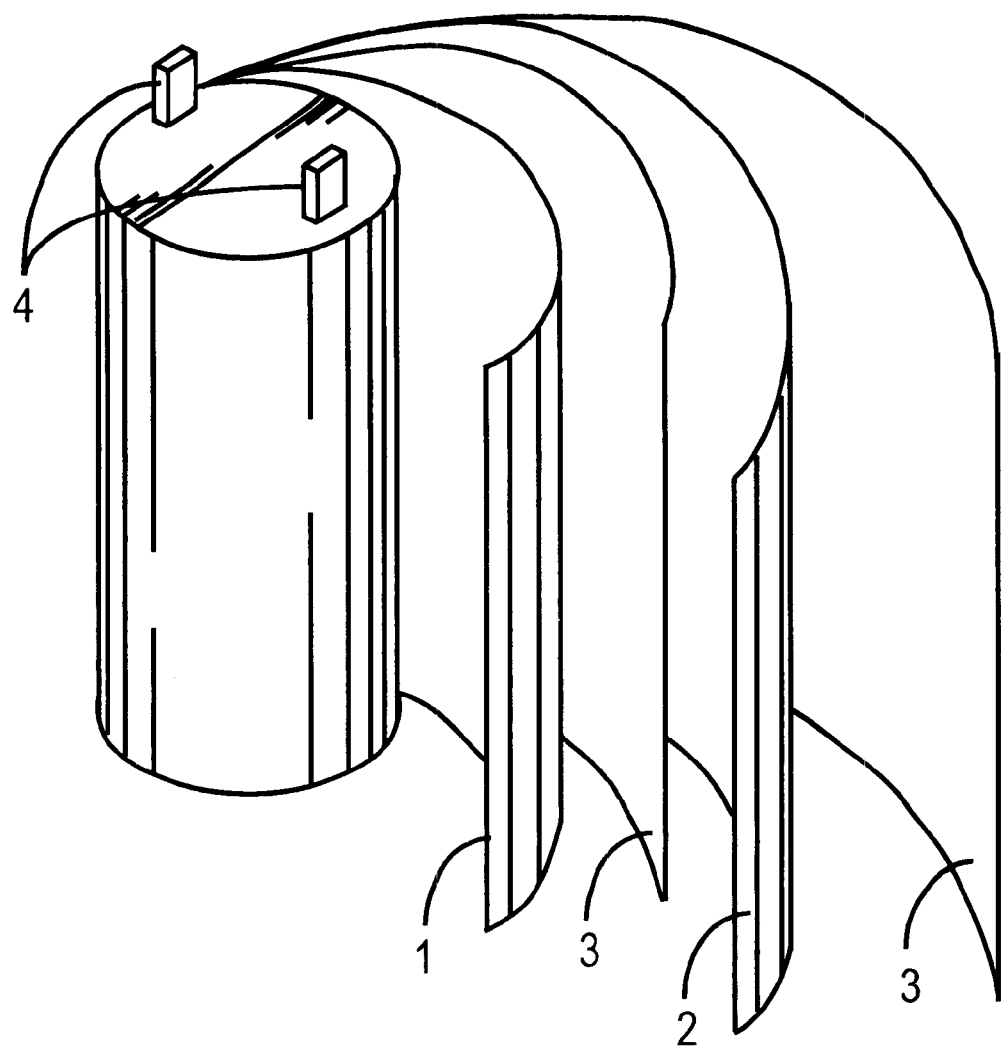
FIG. 2 shows a perspective view indicating the construction of a capacitor element of an electrolytic capacitor.

A life test is conducted on the electrolytes of the present invention and electrolytes of prior art, using 20 electrolytic capacitors for each electrolyte. The structure of the electrolytic capacitors is shown in FIG. 2. The result is shown in Table 3. In Table 3, the first column "No." corresponds to the numbers of the samples in Table 1. The constant rating of the aluminum electrolytic capacitors used here is 300 WV, 100 $\mu$F, and the test was conducted at 105 degrees Celsius.

TABLE 3

| | initial properties | | after 3000 hours of ripple containing load 105° C. | | | |
|---|---|---|---|---|---|---|
| No. | Tan δ (%) | LC ($\mu$A) | ΔC (%) | Tan δ (%) | LC ($\mu$A) | external appearance |
| 1 | 4.3 | 23 | −0.3 | 5.3 | 10 | no change |
| 2 | 4.6 | 21 | −0.1 | 5.5 | 10 | no change |
| 3 | 4.8 | 20 | −0.2 | 5.7 | 10 | no change |
| 4 | 4.9 | 20 | −0.2 | 5.8 | 10 | no change |
| 5 | 5.1 | 18 | −0.1 | 5.9 | 9 | no change |
| 6 | 4.9 | 22 | −0.1 | 5.7 | 10 | no change |
| 7 | 5.0 | 19 | −0.2 | 5.8 | 9 | no change |
| 8 | 5.2 | 18 | −0.1 | 5.9 | 8 | no change |
| 9 | 5.3 | 18 | −0.2 | 5.9 | 8 | no change |
| 10 | 5.4 | 17 | −0.1 | 6.0 | 7 | no change |
| 11 | 3.5 | 19 | −0.1 | 4.3 | 11 | no change |
| 12 | 4.0 | 20 | −0.1 | 4.8 | 10 | no change |
| (A) | impossible to test for short circuits and explosions occurred during aging (all samples) | | | | | |
| (B) | impossible to test for short circuits and explosions occurred during aging (all samples) | | | | | |
| (C) | impossible to test for short circuits and explosions occurred during aging (all samples) | | | | | |
| (D) | 4.5 | 52 | all sample's valves opened by gas generated during the test | | | |

As shown in Table 3, the electrolytic capacitors using the electrolytes of the present invention did not cause any problems such as short circuiting and exploding in the aging process during production and life testing. This result can be attributed to the high discharge initiating voltage characteristic of the electrolyte of the present invention. The changes in capacitance, tan δ, leak current (LC), and external appearance after the test were also small. Thus, an electrolytic capacitor of high reliability can be obtained.

In the ninth and tenth preferred embodiments, the test was conducted by raising the rating of the electrolytic capacitor to 550V. The result of the life test is shown in Table 4. The electrolytic capacitor used for the test was rated at 550 WV, 150 $\mu$F. The test was carried out at 105° C.

TABLE 4

| | initial properties | | after 3000 hours of ripple containing load 105° C. | | | |
|---|---|---|---|---|---|---|
| No. | Tan δ (%) | LC ($\mu$A) | ΔC (%) | Tan δ (%) | LC ($\mu$A) | external appearance |
| 9 | 5.3 | 26 | −0.3 | 6.3 | 7 | no change |
| 10 | 5.4 | 23 | −0.1 | 6.0 | 6 | no change |

As shown in Table 4, although the test was conducted at 550V, the electrolytic capacitors using the electrolytes of the present invention did not cause any problems such as short circuiting and exploding in the aging process during production and life testing. The changes in capacitance, tan δ, leak current (LC), and external appearance after the test were also small. Thus, an electrolytic capacitor of high reliability can be obtained. To ascertain stability at high temperatures, the life test was carried out at 125° C. for the ninth, tenth, eleventh and twelfth preferred embodiments. The result of the test is shown in Table 5. The rating of the electrolytic capacitors used for the test was 550 WV, 100 $\mu$F. Twenty electrolytic capacitors were used for each electrolyte.

TABLE 5

| | initial properties | | after 3000 hours of ripple containing load 125° C. | | | |
|---|---|---|---|---|---|---|
| No. | Tan δ (%) | LC ($\mu$A) | ΔC (%) | Tan δ (%) | LC ($\mu$A) | external appearance |
| 9 | 5.0 | 12 | −0.3 | 7.3 | 6 | no change |
| 10 | 5.1 | 13 | −0.1 | 7.0 | 6 | no change |
| 11 | 3.2 | 15 | −0.3 | 5.3 | 6 | no change |
| 12 | 3.7 | 11 | −0.1 | 5.7 | 6 | no change |

As shown in Table 5, although the test was conducted at 550V, the electrolytic capacitors using the electrolytes of the present invention did not cause any problems such as short circuiting and exploding in the aging process during production and life testing. The changes in capacitance, tan δ, leak current (LC), and external appearance after the test were also small. Thus, an electrolytic capacitor of high reliability can be obtained.

Compounds which can be used for electrolytes of the present invention include hexoses and pentoses such as tallit, sorbitol, mannite, iditol, allodulcitol, dulcite, xylite, penta-erythritol, xylose, arabinose, ribulose, xylulose, lyxose. The effects of these compounds are the same as mannite used in the tenth preferred embodiment. Hexoses include stereo isomers in D type, L type and meso-type. However, there is no difference in effect among stereo isomers. More than one compound of poly-hydric alcohols such as hexoses, pentoses and glycerins can be added and mixed.

The solvent used for preferred embodiments of the present invention was ethylene glycol. However, amides, lactones, glycol derivatives, sulfur containing compounds and carbonate derivatives can also be used as solvent independently or by blending. Preferable solvents among them are propylene carbonate, dimethyl formamide, N-methyl formamide, γ(gamma)-butyro lactone, N-methyl pyrolidone, dimethyl sulfoxide, ethylene cyanhydrine, ethylene glycol, ethylene glycol mono-, and di-alkyl ether. Blending more than one of the solvents mentioned above achieves the same effects as that of preferred embodiments of the present invention.

Organic acids which can be used as electrolytes of the present invention include azelaic acid, adipic acid, glutaric acid, phthalic acid, maleic acid, benzoic acid, 5,6-decan di-carboxylic acid, and 1,6-decan di-carboxylic acid. Ammonium salt, amine salt and amidine salts can be used as salts for the above-mentioned organic acids. More than one organic acid and/or their salts can be mixed to satisfy the requirements of the use.

The concentration of boric acid and a boric acid salt such as ammonium borate in the electrolytes of the present invention is 10 wt % or less in weight. This prevents the valves of the electrolytic capacitor from opening even at 100° C. or more. The electrolytes of the present invention achieve higher discharge initiating voltages.

Using the electrolytes of the present invention enables production of industrially highly valuable electrolytic capacitors which can achieve high withstand voltage properties of not less than 500V even under temperatures of 125° C., and operate steadily for long periods.

What is claimed is:

1. A driving electrolyte for an electrolytic capacitor comprising at least one boric acid ester or salt of the following general formulae (1) or (2),

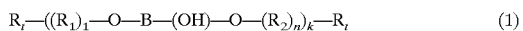

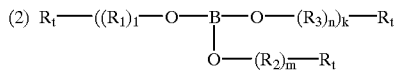

wherein $R_t$: $CH_3$ or H, $R_1$, $R_2$, and $R_3$: $-CH_2O$, $-C_2H_4O$, $-C_3H_6O$, or $-C_4H_8O$, wherein k, l, m, and n are arbitrary whole integers, with l not equal to n, dissolved in a solvent.

2. A driving electrolyte for an electrolytic capacitor comprising:

at least one of the boric acid esters and/or their salts of the general formulae (1) or (2),

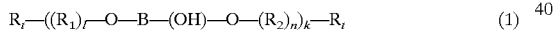

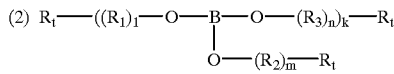

wherein $R_t$: $CH_3$ or H, $R_1$, $R_2$, and $R_3$: $-CH_2O$, $-C_2H_4O$, $-C_3H_6O$, or $-C_4H_8O$, wherein k, l, m, and n are arbitrary whole integers, with l not equal to n, dissolved in a solvent; and at least one of:
(a) inorganic acids and/or their salts, and
(b) organic acids and/or their salts.

3. The driving electrolyte for the electrolytic capacitor according to claim 2, wherein said driving electrolyte further includes boric acid or its salt in an amount of 10% or less by weight.

4. An electrolytic capacitor using a driving electrolyte in which at least one of the boric acid esters and/or their salts of the following general formulae (1) or (2),

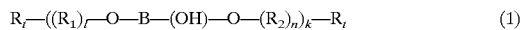

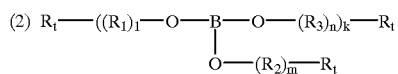

wherein $R_t$: $CH_3$ or H, $R_1$, $R_2$, and $R_3$: $-CH_2O$, $-C_2H_4O$, $-C_3H_6O$, or $-C_4H_8O$, wherein k, l, m, and n are arbitrary whole integers, with l not equal to n, dissolved in a solvent.

5. An electrolytic capacitor using driving electrolyte comprising:

at least one of the boric acid esters and/or their salts of the general formulae (1) or (2),

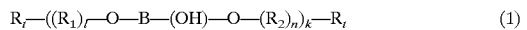

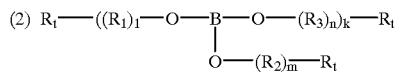

wherein $R_t$: $CH_3$ or H, $R_1$, $R_2$, and $R_3$: $-CH_2O$, $-C_2H_4O$, $-C_3H_6O$, or $-C_4H_8O$, wherein k, l, m, and n are arbitrary whole integers, with l not equal to n, dissolved in a solvent; and at least one of:
(a) inorganic acids and/or their salts, and
(b) organic acids and/or their salts.

6. The electrolytic capacitor according to claim 3, wherein said electrolyte further includes boric acid or its salt in an amount of 10% or less by weight.

* * * * *